United States Patent [19]

Munenaga et al.

[11] Patent Number: 4,947,349

[45] Date of Patent: Aug. 7, 1990

[54] MONITORING SYSTEMS IN SEQUENTIAL PROGRAM CONTROL ARRANGEMENTS

[75] Inventors: Yukio Munenaga, Higashihiroshima; Tomoji Izumi, Hatsukaichi, both of Japan

[73] Assignee: Mazda Motor Corporation, Hiroshima, Japan

[21] Appl. No.: 198,575

[22] Filed: May 25, 1988

[30] Foreign Application Priority Data

May 25, 1987 [JP] Japan .................................. 62-127574

[51] Int. Cl.$^5$ ........................ G06F 15/46; G06F 11/28
[52] U.S. Cl. .............................. 364/551.01; 364/184; 364/580
[58] Field of Search ................ 364/184, 186, 550, 552, 364/551.01, 556, 579, 580, 474.19; 371/26

[56] References Cited

U.S. PATENT DOCUMENTS

| | | | |
|---|---|---|---|
| 3,908,117 | 9/1975 | Naruse et al. | 364/184 |
| 4,370,705 | 1/1983 | Imazeri et al. | 364/184 |
| 4,535,456 | 8/1985 | Bauer et al. | 364/186 |
| 4,536,849 | 8/1985 | Borisch | 364/184 |
| 4,581,701 | 4/1986 | Hess et al. | 364/187 |
| 4,633,384 | 12/1986 | Kusumi | 364/184 |
| 4,638,227 | 1/1987 | Katayama et al. | 364/184 |
| 4,748,553 | 5/1988 | Itoh et al. | 364/184 |

FOREIGN PATENT DOCUMENTS 58-004408 1/1983 Japan .
58-143938 8/1983 Japan .
60-238906 11/1985 Japan .

Primary Examiner—Kevin J. Teska
Attorney, Agent, or Firm—Sixbey, Friedman, Leedom & Ferguson

[57] ABSTRACT

A monitoring system in a sequential program control arrangement comprises an operation detecting portion for detecting operating states of components of the sequential program control arrangement for machinery, a memory for storing reference operating states at sequential check steps, a difference detecting section for detecting a difference between an actual operating state detected by the operation detecting portion and the reference operating state, a control section for causing the difference detecting section to compare the actual operating states detected successively with the reference operating states at corresponding check steps respectively, then after a first check step at which the differnece between the actual operating state and the reference operating state is detected, to compare the actual operating state of the first check step with the reference operating state at each of check steps between the first check step and a second check step ahead of the first check step by a predetermined step number, and further after a third check step at which the reference operating state is coincident with the actual operating step of the first check step, to compare the actual operating states with the reference operating states at check steps ahead of the third check step respectively, and a checking section for checking the operation of the machinery based on the differences detected by the difference detecting section.

5 Claims, 4 Drawing Sheets

MONITORING SYSTEMS IN SEQUENTIAL PROGRAM CONTROL ARRANGEMENTS

BACKGROUND OF THE INVENTION

1. Field of the Invention

The present invention relates generally to monitoring systems in sequential program control arrangements, and more particularly, to a monitoring system of the playback type in a sequential program control arrangement for controlling the operation of machinery.

2. Description of the Prior Art

There has been proposed a sequential program control for controlling machinery to advancing a series of actions thereof step by step in accordance with a program provided for determining the order of the actions. Such a sequential program control is generally utilized for causing assembly line facilities or machine tools to operate automatically for manufacturing or processing various kinds of products.

For the purpose of monitoring operations of machinery under the sequential program control, it has been known to have a composite program in which a program for monitoring is incorporated in the program for controlling the operations of the machinery so as to issue a warning when an abnormal operation is detected. In the case where such a composite program is used, however, there are disadvantages in that the composite program becomes very large in scale to include a large number of programmed steps and further it is required to remake both the program for controlling the operations of the machinery and the program for monitoring the operations of the machinery when the machinery is changed.

Apart from the monitoring mentioned above, there has been also proposed a monitoring system of the playback type in which machinery is once preliminarily operated correctly under the sequential program control so that operating states of each component of a control arrangement provided for conducting actually the sequential program control for the machinery are stored in a memory sequentially at every operation step in which a change in the operating states raises. Next actual operating states of each component of the control arrangement provided for conducting actually the sequential program control for the machinery are collated with the stored operating states in the memory respectively in sequence so as to check whether the actual operating states coincide with the stored operating states in the memory or not during a practical operation of the machinery under the sequential program control. A warning is issued when the actual operating state which does not coincide with the corresponding stored operating state in the memory is detected. One example of the monitoring system of the playback type in which the operation of the machinery is considered to be in malfunction when at least two successive actual operating states do not coincide with the corresponding stored operating states in the memory, respectively, and actual operating steps immediately before and after the successive operating steps which do not coincide with the corresponding stored operating states in the memory are stored in the memory so as to facilitate to clarify a cause of a malfunction of the machinery, is disclosed in the Japanese patent application published before examination under publication No. 60-238906.

Such a monitoring system of the playback type as described above may encounters problems as mentioned below.

In the case where a couple of switches which are independently in an ON or OFF state are provided in the monitoring system of the playback type to detect actual operating states of components of a control arrangement for conducting actually the sequential program control for machinery and the control arrangement is operative to cause the machinery to have an action by means of operating an actuator, such as a cylinder device, when both the switches are in the ON state to satisfy an AND condition, there are three different transitions of the operating states of the components of the control arrangement to reaching a situation wherein the switches satisfy the AND condition, that is, two transitions of the operating states in each of which one of the switches comes to be in the ON state first and then the other of the switches comes to be the ON state, and another transition in which both switches come to be in the ON state simultaneously. However, only one of three transitions is usually memorized when the operating states of each component of the control arrangement are previously stored in the memory sequentially at every operation steps, and therefore each of other two transitions are dealt with as an incorrect transition regardless of a proper actual operation of the machinery when the actual operating states of each component of the control arrangement are collated with the stored operating states in the memory respectively in sequence.

To avoid this disadvantage, it is considered to store in the memory all transitions of the operating states of each component of the control arrangement possible to appear during the proper actual operation of the machinery. In such a case, however, the memory is required to have an impracticably large storage capacity.

Further, it is also considered to modify the monitoring system of the playback type to perform monitoring only at selected operation steps in each of which a change in action of the machinery caused by an actuator included in the control arrangement arises. In the case of the monitoring system thus modified, however, the results of monitoring are reduced in reliability and further it is difficult to clarify a cause of a malfunction of the machinery when the malfunction is detected as a result of monitoring.

OBJECTS AND SUMMARY OF THE INVENTION

Accordingly, it is an object of the present invention to provide a monitoring system in a sequential program control arrangement, which avoids the aforementioned disadvantages and problems encountered with the prior art.

Another object of the present invention is to provide a monitoring system in a sequential program control arrangement, which is formed to be of the playback type and improved to restrain a wrong result of check in monitoring on the operation of machinery subjected to a sequential program control so that the results of the monitoring are improved in reliability.

A further object of the present invention is to provide a monitoring system in a sequential program control arrangement, which is formed to be of the playback type and improved to facilitate to clarify the cause of a malfunction of machinery subjected to a sequential program control when the malfunction is detected as a result of monitoring, without causing the results of the monitoring to be reduced in reliability.

According to the present invention, there is provided a monitoring system in a sequential program control arrangement, which comprises an operation detecting portion for detecting operating states of a plurality of components of the sequential program control arrangement for controlling machinery; a memory for storing the operating states of the components of the sequential program control arrangement, which are obtained sequentially under a normal operation of the machinery at every operation step in which a change in the operating states arises, therein in the form of reference operating states at sequential check steps. A difference detecting section is provided for detecting a difference between an actual operating state detected by the operation detecting portion with the reference operating state stored in the memory; and a difference detection control section is provided for causing the difference detecting section to compare the actual operating states detected successively by the operation detecting portion with the reference operating states at corresponding check steps respectively. After a first check step at which the difference between the actual operating state and the reference operating state compared with each other is detected by the difference detecting section, the difference detection control section compares the actual operating state corresponding to the first check step with the reference operating state at each of check steps between the first check step and a second check step ahead of the first check step by a predetermined step number, and further after a third check step between the first and second check steps at which the reference operating state is coincident with the actual operating state corresponding to the first check step, to compare each of the actual operating states detected by the operation detecting portion after the actual operating state corresponding to the first check step with the reference operating states at check steps ahead of the third check step respectively. A checking section is provided for checking the operation of the machinery based on the difference detected by the difference detecting section.

In the monitoring system thus constituted in accordance with the present invention, after the machinery starts operating, the actual operating states detected by the operation detecting portion are compared with the reference operating states stored in the memory respectively at every check step and it is checked whether the actual operating state is coincident with the corresponding reference operating state or not. When the difference between the actual operating state and the reference operating state compared with each other is detected at the first check step, it is checked whether the reference operating states at check steps ahead of the first check step include one which is coincident with the actual operating state corresponding to the first check step or not, by means of comparing the actual operating state corresponding to the first check step with the reference operating state at each of the check steps between the first and second check steps. As a result, when it is clarified that the reference operating state at the third check step between the first and second check steps is coincident with the actual operating state corresponding to the first check step, the actual operating states detected by the operation detecting portion after the actual operating state corresponding to the first check step are compared with the reference operating states at the check steps ahead of the third check step respectively. In such a case, since merely a transition of the actual operating state, for example, to meet an AND condition relating to the components of the sequential program control arrangement is different from a transition of the reference operating states to meet the AND condition relating to the components of the sequential program control arrangement and the machinery is operating appropriately, the monitoring on the operation of the machinery is continued without coming to a decision that the machinery is abnormal.

In contrast, when there is no reference operating state coincident with the actual operating state corresponding to the first check step at the check steps between the first and second check steps, it is checked whether a change in the actual operating states arises within a predetermined period of time from that time on or not, by means of, for example, a change detecting section which may be additionally provided. In the case where the change in the actual operating states arises within the predetermined period of time, since the machinery is still operating, the monitoring on the operation of the machinery is continued without coming to a decision that the machinery is abnormal. On the other hand, if any change in the actual operating states does not arise within the predetermined period of time, the machinery is judged to be abnormal and a cause of abnormality of the machinery is investigated based on the elements having made the actual operating state corresponding to the first check step different from the reference operating state at the first check step.

With the monitoring system according to the present invention, a wrong result of check in the monitoring on the operation of machinery subjected to a sequential program control is restrained even in the case where the operating states of the components of the sequential program control arrangement are changed to meet AND conditions in the sequential program control and therefore the results of the monitoring are improved in reliability.

The above, and other objects, features and disadvantages of the present invention will become apparent from the following detailed description which is to be read in conjunction with the accompanying drawings.

DESCRIPTION OF THE PREFERRED EMBODIMENT

Figure 1:
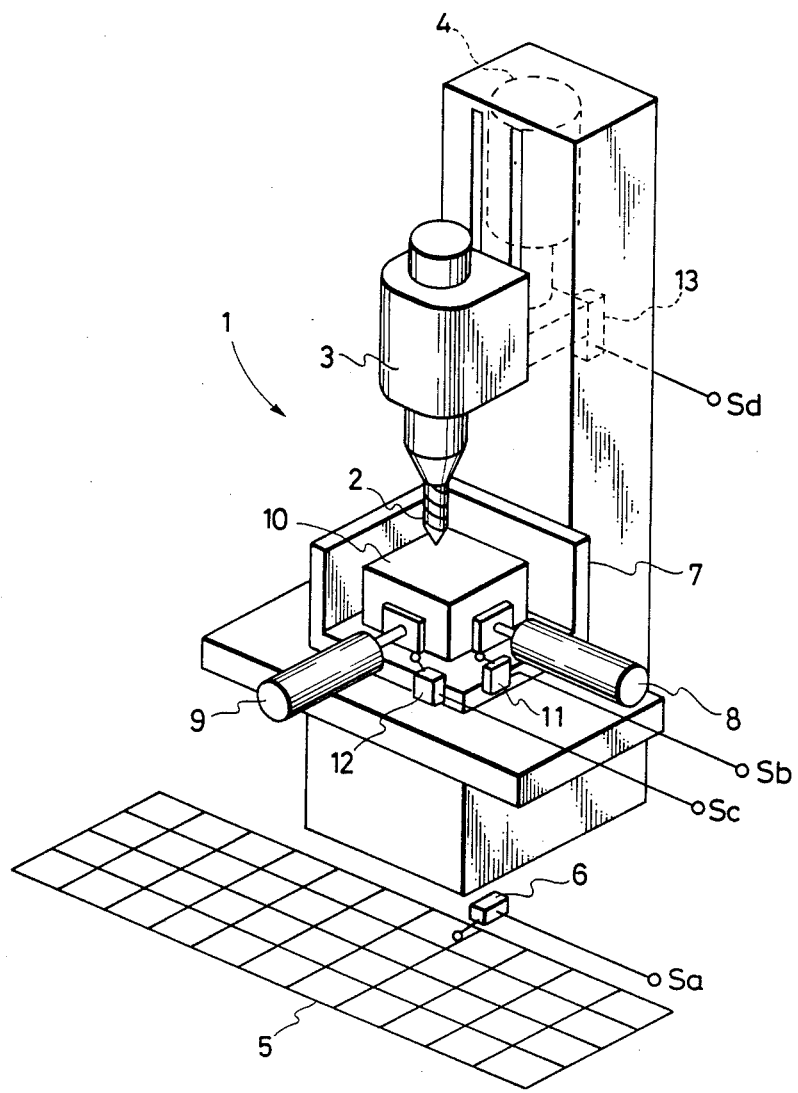
FIG. 1 is a schematic perspective view showing an example of machinery to which an embodiment of monitoring system in a sequential program control arrangement according to the present invention is applied.
Figure 2:
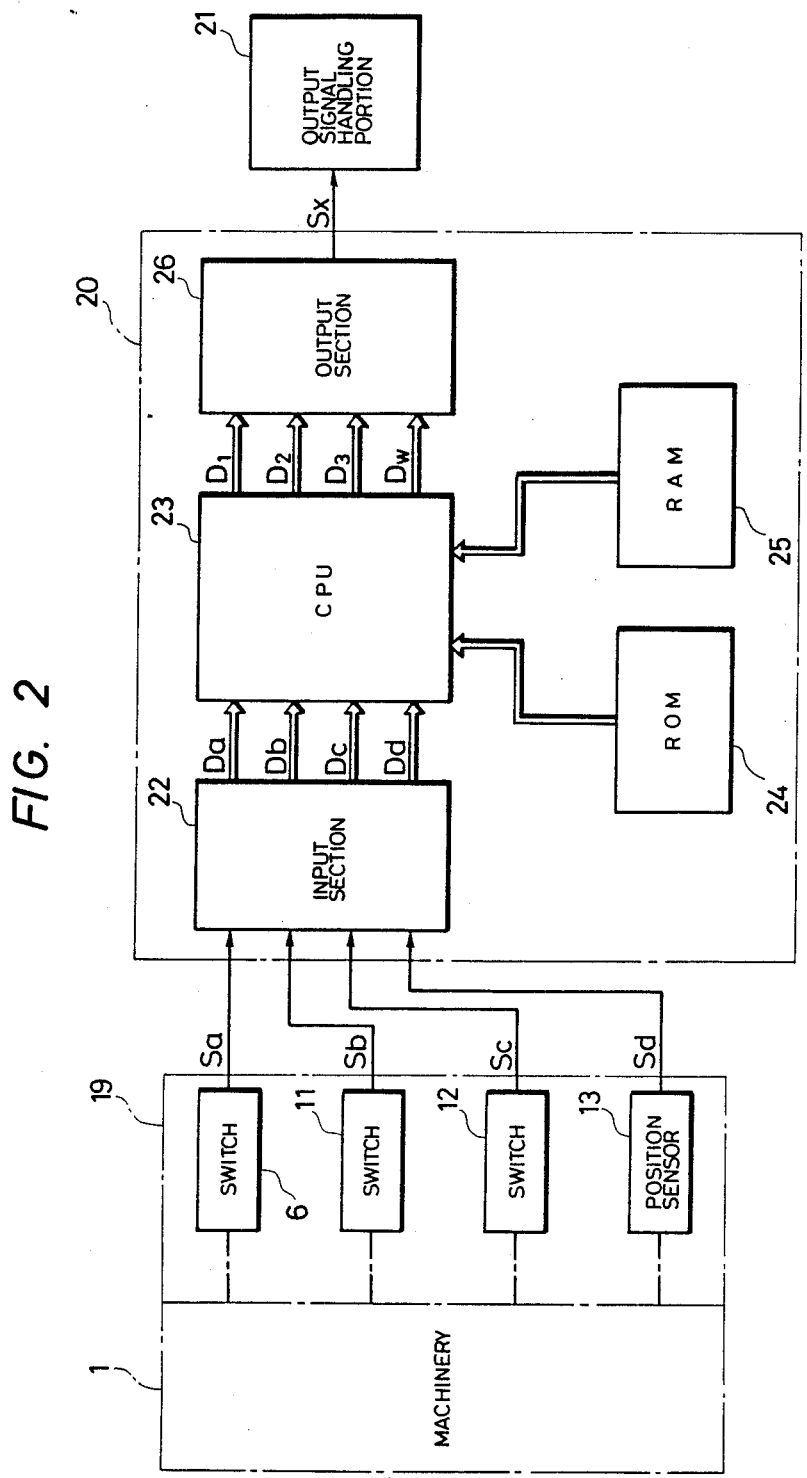
FIG. 2 is a schematic block diagram showing one embodiment of monitoring system in a sequential program control arrangement according to the present invention.

FIG. 1 shows an example of a machinery subjected to a sequential program control and monitored by an embodiment of monitoring system in a sequential program control arrangement according to the present invention which is shown in FIG. 2.

Referring to FIG. 1, a machinery 1 which constitutes a drilling processor has a working head 3 provided with a drill 2. The working head 3 is driven to move up and down by a cylinder 4 which constitutes one of components of a sequential program control arrangement performing the sequential program control for the operation of the machinery 1. The machinery 1 has a work table 7 on which a work 10 is placed to be drilled by the drill 2. The work 10 is positioned to be appropriate for drilling on the working table 7 by positioning cylinders 8 and 9 each of which also constitutes a component of the sequential program control arrangement. Further, a safety mat 5 on which a worker stands, for example, to set the work 10 on the work table 7 or to take the work 10 out of the work table 7.

A switch 6 is provided in relation to the safety mat 5 for detecting a condition in which there is no worker on the safety mat 5 and operative to be kept in an ON state to produce a detection output signal Sa with a high level when the worker is not on the safety mat 5 and turned into an OFF state to produce the detection output signal Sa with a low level when the worker stands on the safety mat 5. Switches 11 and 12 are also provided in relation to the positioning cylinders 8 and 9 to detect operations of the positioning cylinders 8 and 9 for positioning the work 10 at a proper position on the work table 7, respectively. The switch 11 is kept in an ON state to produce a detection output signal Sb with a high level when the positioning cylinder 8 is operating to keep the work 10 at the proper position on the work table 7, and the switch 12 is kept in an ON state to produce a detection output signal Sc with a high level when the positioning cylinder 9 is operating to keep the work 10 at the proper position on the work table 7.

The cylinder 4 is operative to drive the working head 3 to go down so that the work 10 on the work table 7 is processed by the drill 2 when the switches 6, 11 and 12 are in the respective ON states. A position sensor 13 is provided in relation to the cylinder 4 for detecting a descended position of the cylinder 4 and produces a detection output signal Sd with a high level when the descended position of the cylinder 4 is detected thereby.

The switches 6, 11 and 12 and the position sensor 13 constitute portions of the embodiment of monitoring system according to the present invention shown in FIG. 2. The embodiment of monitoring system according to the present invention shown in FIG. 2 comprises an operation detecting portion 19 including the switches 6, 11 and 12 and the position sensor 13 which produce the detection output signals Sa, Sb, Sc and Sd, respectively, as described above, a control block 20 to which the detection output signals Sa, Sb, Sc and Sd are supplied, and an output signal handling portion 21 connected to the control block 20. The control block 20 comprises an input section 22 which produces input data Da, Db, Dc and Dd based on the detection output signals Sa, Sb, Sc and Sd, respectively, a central processing unit (CPU) 23 which is supplied with the input data Da, Db, Dc and Dd from the input section 22 and produces output data $D_1$, $D_2$, $D_3$ and Dw, a read only memory (ROM) 24 from which an operation program for sequential operations in the CPU 23 is rear, a random access memory (RAM) 25 in which data processed by the CPU are stored and from which the data stored therein are read, and an output section 26 which is supplied with the output data $D_1$, $D_2$, $D_3$ and Dw from the CPU and produces an output signal Sx to be supplied to the output signal handling portion 21.

In the embodiment of the present invention thus constituted, a playback monitoring for the operation of the machinery 1 controlled by the sequential program control arrangement is effected mainly by the CPU 23 in the control block 20 which operates in accordance with the operation program read from the ROM 24, as follows.

When the machinery 1 operates under the control by the sequential program control arrangement including the cylinder 4, safety mat 5 and positioning cylinders 8 and 9, the input section 22 in the control block 20 produces the input data Da which represent "1" and "0" in response to respectively the high and low levels of the detection output signal Sa obtained from the switch 6, the input data Db which represent "1" and "0" in response to respectively the high and low levels of the detection output signal Sb obtained from the switch 11, the input data Dc which represent "1" and "0" in response to respectively the high and low levels of the detection output signal Sc obtained from the switch 12, and the input data Dd which represent "1" and "0" in response to respectively the high and low levels of the detection output signal Sd obtained from the position sensor 13. This results in that operating states of the safety mat 5, positioning cylinders 8 and 9 and cylinder 4, each of which is a component of the sequential program control arrangement, (hereinafter, the safety mat 5, positioning cylinders 8 and 9 and cylinder 4 are referred to as the control components), detected by the switch 6, the switches 11 and 12 and the position sensor 13 respectively are represented by the input data Da to Dd.

Prior to a practical monitoring for the operation of the machinery 1, the CPU 23 in the control block 20 operates to store previously in the RAM 25 the operating state of the control components represented by the input data Da to Dd under a complete series of normal operation of the machinery 1 at every operation step in which a change in the operating states arises as reference operating states at sequential check steps.

Then, in the practical monitoring, the CPU 23 is operative to detect a change in an actual operating state of the control components represented by the input data Da to Dd and to compare the actual operating state of the control components with the reference operating state at each check step stored in the RAM 25 so as to check whether the actual operating state is coincident with the corresponding reference operating state or not whenever the change in the actual operating state is detected. When a difference between the actual operating state and the reference operating state compared with each other is detected at a certain check step, for example, the Nth check step, the CPU 23 advances the number of the check step by one to read the reference operating state at the N+1th check step from the RAM 25 and checks whether the actual operating state corresponding to the Nth check step is coincident with the reference operating state at the N+1th check step. (Such a check as carried out with increment of the number of the check step is referred to as a forward check, hereinafter.). As a result of the forward check, if it is clarified that the reference operating state at the N+1th check step is coincident with the actual operating state corresponding to the Nth check step, the CPU 23 is operative to compare each of the actual operating states represented by the input data Da to Dd after the actual operating state corresponding to the Nth check step with the reference operating state at each of the check steps ahead of the N+1th check step successively so that the monitoring is continued. To the contrary, if it is clarified that the reference operating state at the N+1th check step is not coincident with the actual operating state corresponding to the Nth check step, the CPU 23 conducts forward checking to checked whether the actual operating state corresponding to the Nth check step is coincident with the reference operating state at the N+2th check step or not. Such a forward check may be repeated.

In the embodiment, the CPU 23 is operative to check whether the reference operating state which is different from the actual operating state includes a change in the operation represented by the input data Dd, that is, a change in the operation of the cylinder 4 for moving the working head 3 or not before each forward check is conducted. This means generally that it is checked whether the reference operating state which is different from the actual operating state includes a change in an effective action of the machinery 1 or not before each forward check is conducted. If the reference operating state which is different from the actual operating state includes the change in the operation represented by the input data Dd, the CPU 23 does not conduct the forward check but sends out the output data $D_1$ indicating the component, that is, the safety mat 5, positioning cylinder 8 or 9, or cylinder 4, which has made a cause of the difference between the actual operating state and the reference operating state at the check step on that occasion. Then, the CPU 23 reduces the number of the check step to cancel the increment due to the forward check so as to return to the Nth check step and sends output data $D_2$ indicating the component, that is, the safety mat 5, positioning cylinder 8 or 9, or cylinder 4, which made a cause of the difference between the actual operating state and the reference operating state at the Nth check step.

After that, the CPU 23 is operative to detect a change in the actual operating state represented by the input data Da to Dd arising within a predetermined reference period of time To. In the case where the change in the actual operating state represented by the input data Da is detected within the predetermined time of period To, the CPU 23 sends out the output data $D_3$ which withdraw the output data $D_1$ and $D_2$ previously sent out and then checks whether the detected change has been cause by the operation represented by the input data Dd, that is, the detected change has been caused by the cylinder 4, or not. As a result of such a check, if the detected change has been cause by the operation represented by the input data Dd, the CPU 23 is operative to advance the check steps up to one at which the reference operating state include a change in the operation represented by the input data Dd, and resumes the monitoring with comparing the actual operating state of the control components with the reference operating state at the advanced check step. On the other hand, if the detected change has not been caused by the operation represented by the input data Dd, the CPU 23 is operative to resume the monitoring with comparing the actual operating state represented by the input data Da to Dd with the reference operating state at the N+1th check step.

Further, in the case where the change in the actual operating state of the control components is not detected within the predetermined time of period To, the CPU 23 sends out the output data Dw which act as warning data.

The output data $D_1$, $D_2$, $D_3$ and Dw sent out the CPU 23 are supplied to the output section 26 and the output section 26 produces the output signal Sx corresponding to each of the output data $D_1$, $D_2$, $D_3$ and Dw to be supplied to the output signal handling portion 21 wherein the output signal Sx is dealt with appropriately in accordance with its contents, so that, for example, a warning for abnormality of the machinery 1 is issued in response to the output data Dw or a cause of abnormality of the machinery 1 is investigated based on the output data $D_1$ and $D_2$.

Figure 3A:
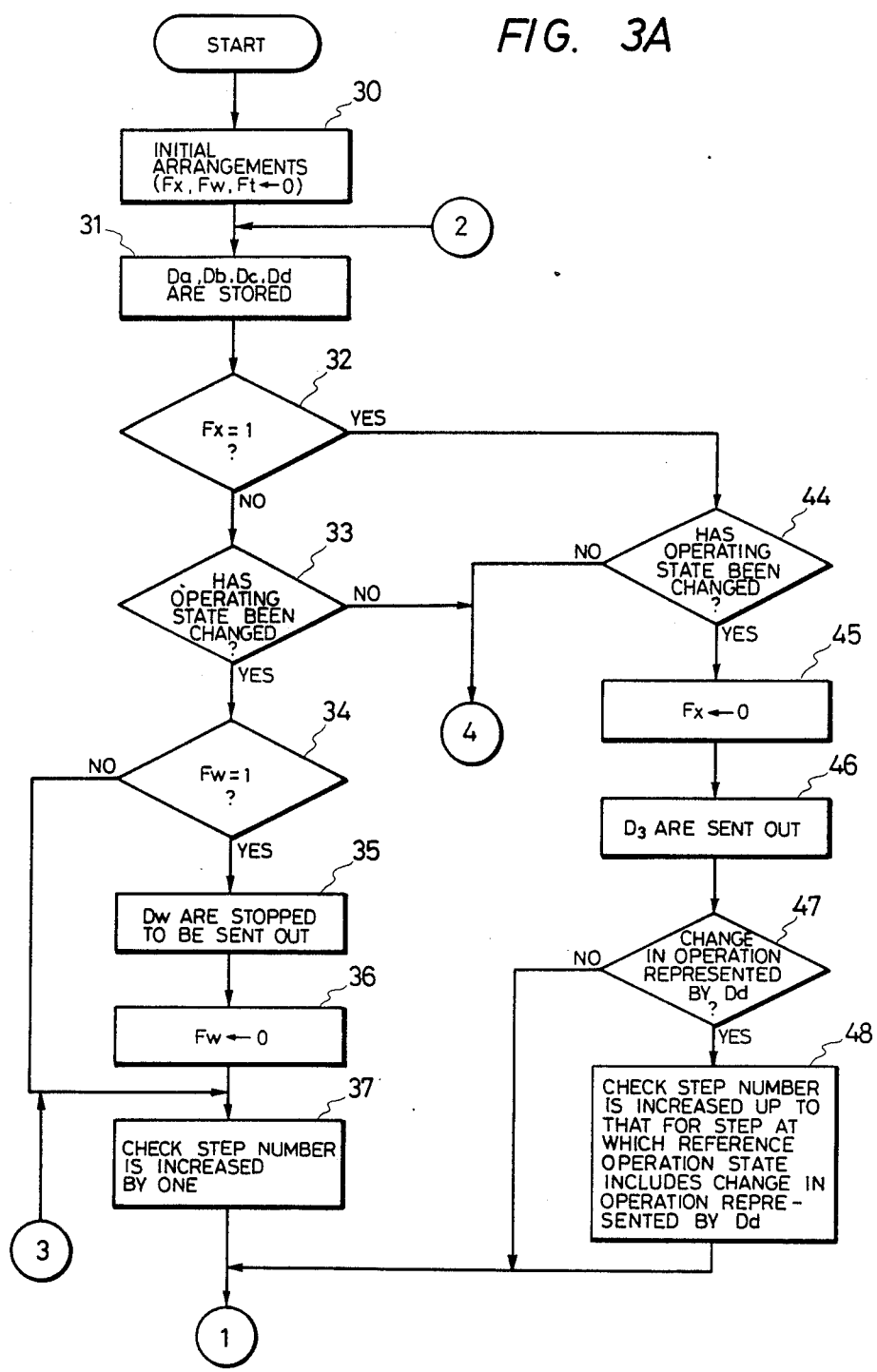
FIGS. 3A and 3B show together is a flow chart showing one example of an operation program for a microcomputer used in a central processing unit employed in the embodiment shown in FIG. 2.
Figure 3B:
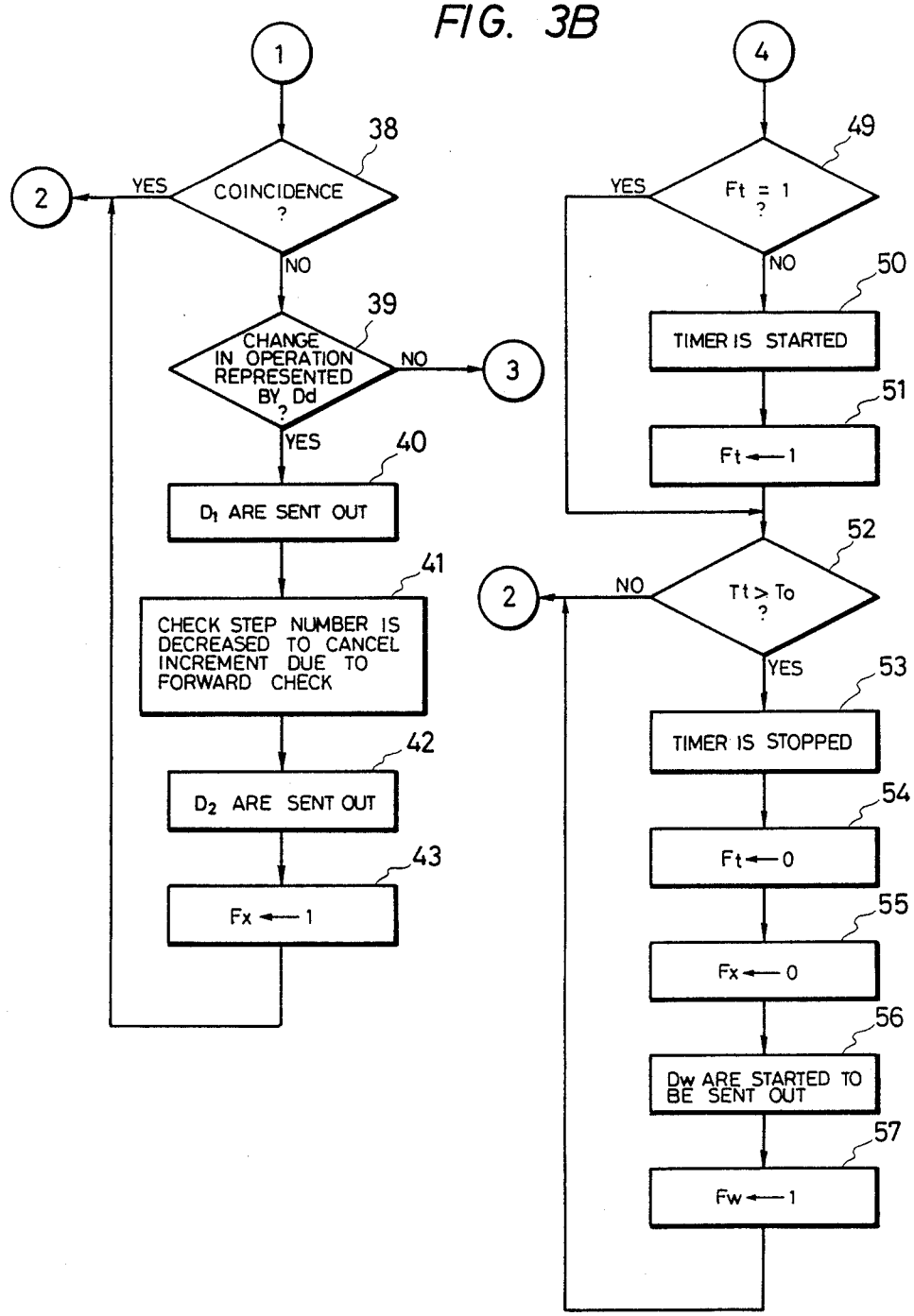

The control operations of the CPU 23 for the practical monitoring as described above are carried out in accordance with, for example, a flow chart shown in FIGS. 3A and 3B.

In the control operations of the CPU 23 according to the flow chart shown in FIGS. 3A and 3B, first, initial arrangements for setting each of flags Fx, Fw and Ft to be "0" are conducted, in process 30. Then, the input data Da to Dd are stored, in process 31, and it is checked whether type flag Fx is equal to "1" or not in decision 32. If the flag Fx is not "1", it is checked whether the actual operating state of the control components represented by the input data Da to Dd has been changed or not in decision 33. When it is clarified that the actual operating state represented by the input data Da to Dd has not been changed, the step advances to decision 49.

When it is clarified in the decision 33 that the actual operating state represented by the input data Da to Dd has been changed, it is checked whether the flag Fw is equal to "1" or not in decision 34. If the flag Fw is not equal to "1", the step advances directly to a process 37. To the contrary, if the flag Fw in equal to "1", the output data Dw are stopped to be sent out in process 35 and the flag Fw is set to be "0" in process 36, then the step advances to the process 37. In the process 37, the number of the check step is increased by one. Then, it is checked whether the actual operating state represented by the input data Da to Dd is coincident with the reference operating state at the check step designated in the preceding process read from the RAM 25 or not, in decision 38. When the actual operating state is coincident with the reference operating state at the check step determined in the preceding process, the step returns to the process 31, and when the actual operating state is not coincident with the reference operating state at the check step determined in the preceding process, it is checked whether the reference operating state at the check step determined in the preceding process includes a change in the operation represented by the input data Dd or not in decision 39.

If it is clarified in the decision 39 that the reference operating state does not include the change in the operation represented by the input data Dd, the step returns to the process 37. To the contrary, if it is clarified in the decision 39 that the reference operating state includes the change in the operation represented by the input data Dd, the output data $D_1$ are sent out in process 40 and the number of the check step is decreased to cancel the increment due to the forward check performed previously, in process 41. After the output data $D_2$ are sent out in process 42 and the flag Fx is set to be "1" in process 43, the program returns to the process 31.

On the other hand, when it is clarified in the decision 32 that the flag Fx is equal to "1", it is checked whether the actual operating state represented by the input data Da to Dd has been changed or not in decision 44. When it is clarified that the actual operating state represented by the input data Da to Dd has not been changed, the step advances to the decision 49, and when it is clarified in the decision 44 that the actual operating state represented by the input data Da to Dd has been changed, the flag Fx is set to be "0" in process 45 and the output data $D_3$ are sent out in process 46. Then, it is checked whether the actual operating state represented by the input data Da to Dd includes a change in the operation represented by the input data Dd or not in decision 47.

When it is clarified in the decision 47 that the actual operating state does not include the change in the operation represented by the input data Dd, the step advances to the decision 38 and advances further therefrom in such a manner as described above. To the contrary, when it is clarified in the decision 47 that the actual operating state include the change in the operation represented by the input data Dd, the number of the check step is increased up to that for the check step at which the reference operating state include a change in the operation represented by the input data Dd so as to read the reference operating state include a change in the operation represented by the input data Dd from the RAM 25, in process 48, and the step advances to the decision 38 and advances further therefrom in such a manner as described above.

Further, in the decision 49, it is checked that the flag Ft is equal to "1" or not. If the flag Ft is not "1", a timer contained in the CPU 23 is started operating in process 50 and the Flag Ft is set to be "1" in process 51, then the step advances to the decision 52. If the flag Ft is "1" in the decision 49, the step advances to the decision 52 without passing through the process 50 and 51.

In the decision 52, it is checked whether a period of time Tt measured by the timer has exceeded the predetermined reference period of time To or not. The reference period of time To is selected to be long enough for confirming stoppage of the operation of the machinery 1. When it is clarified in the decision 52 that the period of time Tt has not exceeded the reference period of time To, the step returns to the process 31. On the other hand, when it is clarified in the decision 52 that the period of time Tt has exceeded the reference period of time To, the timer is stopped operation in process 53, the flags Ft and Fx are set to be "0" in processes 54 and 55, respectively, and the output date Dw is started to be sent out in process 56. After that, the flag Fw is set to be "1" in process 57 and then the step returns to the process 31.

Now, the practical monitoring on the machinery 1 carried out by the embodiment shown in FIG. 2 under each of three cases embodied by way of examples will be explained below.

Case I:

The reference operating states stored in the RAM 25 are shown in Table 1 and the actual operating states of the control components are shown in Table 2.

TABLE 1

| input data | check step | | | |
|---|---|---|---|---|
| | (1) | (2) | (3) | (4) |
| Da | 0 | 1 | 1 | 1 |
| Db | 0 | 0 | 1 | 1 |
| Dc | 0 | 0 | 0 | 1 |
| Dd | 0 | 0 | 0 | 1 |

TABLE 2

| input data | step | | |
|---|---|---|---|
| | (a) | (b) | (c) |
| Da | 0 | 0 | 1 |
| Db | 0 | 1 | 1 |
| Dc | 0 | 1 | 1 |
| Dd | 0 | 0 | 1 |

In case I, first, it is checked whether an operating state at step (a) is coincident with an operating state at check step (1) or not. The operating state at step (a) is coincident with the operating state at check step (1). Then, it is checked whether an operating state at step (b) is coincident with an operating state at check step (2) or not. The operating state at step (b) is not coincident with the operating state at check step (2), and the operating state at check step (2) does not include a change in the operation represented by the input date Dd. Therefore, the number of the check step is increased by 1 to perform the forward check and it is checked whether the operating state at step (b) is coincident with an operating state at check step (3) or not. The operating state at step (b) is not coincident with the operating state at check step (3), and the operating state at check step (3) does not include a change in the operation represented by the input date Dd. Accordingly, the number of the check step is further increased by 1 to perform the forward check and it is checked whether the operating state at step (b) is coincident with an operating state at check step (4) or not. The operating state at step (b) is not coincident with the operating state at check step (4), and the operating state at check step (4) includes a change in the operation represented by the input date Dd. Therefore, the output data $D_1$ indicating the safety mat 5 and the cylinder 4 are sent out, the check step is returned to step check (2), and the output data $D_2$ indicating the safety mat 5 and the positioning cylinders 8 and 9 are sent out.

Then, when the actual operating state is changed to an operating state at step (c), the output data $D_3$ are sent out to withdraw the output data $D_1$ and $D_2$ previously sent out. Since the operating state at step (c) includes a change in the operation represented by the input data Dd, the check step is advanced to check step (4) and it is checked whether the operating state at step (c) is coincident with the operating state at check step (4) or not. The operating state at step (c) is coincident with the operating state at check step (4).

In this case, the monitoring is completed without sending out the output data Dw.

Case II:

The reference operating states stored in the RAM 25 are shown in Table 3 and the actual operating states of the control components are shown in Table 4.

TABLE 3

| input data | check step | |
|---|---|---|
| | (1) | (2) |
| Da | 0 | 1 |
| Db | 0 | 1 |
| Dc | 0 | 1 |
| Dd | 0 | 1 |

TABLE 4

| input data | step | | | |
|---|---|---|---|---|
| | (a) | (b) | (c) | (d) |
| Da | 0 | 1 | 1 | 1 |

TABLE 4-continued

| input data | step | | | |
|---|---|---|---|---|
| | (a) | (b) | (c) | (d) |
| Db | 0 | 0 | 1 | 1 |
| Dc | 0 | 0 | 0 | 1 |
| Dd | 0 | 0 | 0 | 1 |

In case II, first, it is checked whether an operating state at step (a) is coincident with an operating state at check step (1) or not. The operating state at step (a) is coincident with the operating state at check step (1). Then, it is checked whether an operating state at step (b) is coincident with an operating state at check step (2) or not. The operating state at step (b) is not coincident with the operating state at check step (2), and the operating state at check step (2) includes a change in the operation represented by the input date Dd. Therefore, the output data $D_1$ indicating the positioning cylinders 8 and 9 and the cylinder 4 are sent out.

Then, when the actual operating state is changed to an operating state at step (c), the output data $D_3$ are sent out to withdraw the output date $D_1$ previously sent out, and it is checked whether the operating state at step (c) is coincident with the operating state at check step (2) or not. The operating state at step (c) is not coincident with the operating state at check step (2), therefore, the output data $D_1$ indicating the positioning cylinder 9 and the cylinder 4 are sent out.

When the actual operating state is changed to an operating state at step (d), the output data $D_3$ are sent out to withdraw the output date $D_1$ previously sent out, and it is checked whether the operating state at step (d) is coincident with the operating state at check step (2) or not. The operating state at step (d) is coincident with the operating state at check step (2).

In this case also, the monitoring is completed without sending out the output data Dw.

Case III:

The reference operating states stored in the ROM 25 are shown in Table 5 and the actual operating states of the control components are shown in Table 6.

TABLE 5

| input data | check step | | | |
|---|---|---|---|---|
| | (1) | (2) | (3) | (4) |
| Da | 0 | 1 | 1 | 1 |
| Db | 0 | 0 | 1 | 1 |
| Dc | 0 | 0 | 0 | 1 |
| Dd | 0 | 0 | 0 | 1 |

TABLE 6

| input data | step | | |
|---|---|---|---|
| | (a) | (b) | (c) |
| Da | 0 | 0 | 0 (stop) |
| Db | 0 | 1 | 1 |
| Dc | 0 | 1 | 1 |
| Dd | 0 | 0 | 0 |

In case III, first, it is checked whether an operating state at step (a) is coincident with an operating state at check step (1) or not. The operating state at step (a) is coincident with the operating state at check step (1). Then, it is checked whether an operating state at step (b) is coincident with an operating state at check step (2) or not. The operating state at step (b) is not coincident with the operating state at check step (2), and the operating state at check step (2) does not include a change in the operation represented by the input date Dd. Therefore, the number of the check step is increased by 1 to perform the forward check and it is checked whether the operating state at step (b) is coincident with an operating state at check step (3) or not. The operating state at step (b) is not coincident with the operating state at check step (3), and the operating state at check step (3) does not include a change in the operation represented by the input date Dd. Accordingly, the number of the check step is further increased by 1 to perform the forward check and it is checked whether the operating state at step (b) is coincident with an operating state at check step (4) or not. The operating state at step (b) is not coincident with the operating state at check step (4), and the operating state at check step (4) includes a change in the operation represented by the input date Dd. Therefore, the output data $D_1$ indicating the safety mat 5, the positioning cylinder 9 and cylinder 4 are sent out, the check step is returned to step check (2), and the output data $D_2$ indicating the safety mat 5 and the positioning cylinder 8 are sent out.

Then, when the actual operating state is changed to an operating state at step (c), the output data $D_3$ are sent out to withdraw the output data $D_1$ and $D_2$ previously sent out, and it is checked whether the operating state at step (c) is coincident with the operating state at check step (2) or not. The operating state at step (c) is not coincident with the operating state at check step (2), and the operating state at step (c) does not include a change in the operation represented by the input date Dd. Therefore, the number of the check step is increased by 1 to perform the forward check and it is checked whether the operating state at step (c) is coincident with the operating state at check step (3) or not.

The operating state at step (c) is not coincident with the operating state at check step (3), and the operating state at check step (3) does not include a change in the operation represented by the input date Dd. Accordingly, the number of the check step is further increased by 1 to perform the forward check and it is checked whether the operating state at step (c) is coincident with the operating state at check step (4) or not. The operating state at step (c) is not coincident with the operating state at check step (4), and the operating state at check step (4) includes a change in the operation represented by the input date Dd. Therefore, the output data $D_1$ indicating the safety mat 5 and the cylinder 4 are sent out, the check step is returned to check step (2), and the output data $D_2$ indicating the safety mat 5 and the positioning cylinders 8 and 9 are sent out.

After that, the machinery 1 is abnormally stopped operating and the actual operating state is not changed. Accordingly, the output data Dw are sent out.

In this case, the output data $D_1$ sent out secondary indicate the safety mat 5 and the cylinder 4, and the output data $D_2$ sent out secondary indicate the safety mat 5 and the positioning cylinders 8 and 9. Consequently, it is presumed that the safety mat 5 which is indicated by both the output data $D_1$ and $D_2$ will be a cause of the abnormality of the machinery 1.

In the embodiment operating as described above, the forward check is restricted by the check step at which the reference operating state includes the change in the operation represented by the input data Dd resides, and therefore the forward check is prevented from being conducted uselessly and the monitoring is prevented from running away undesirably.

What is claimed is:

1. A monitoring system comprising:
   operation detecting means for detecting operating states of a plurality of components in a sequential program control arrangement for controlling machinery,
   said components comprising an outlet component which causes a change in an effective action of the machinery and input components, wherein said output component causes the change when the input components are in respective predetermined operating states,
   memory means for storing reference operating states of said components, which are predetermined as normal operating states obtained sequentially under a normal operation of the machinery at every operation step in which a change in the operating states arises, therein in the form of reference operating states at sequential check steps,
   difference detecting means connected to both the operation detecting means and the memory means for detecting a difference between an actual operating state detected by said operation detecting means with the reference operating state stored in said memory means,
   difference detection control means for causing said difference detecting means to compare the actual operating states detected successively by said operation detecting means with the reference operating states at corresponding check steps respectively, then after a first check step at which the difference between the actual operating state and the reference operating state compared with each other is detected by the difference detecting means, to compare the actual operating state corresponding to the first check step with the reference operating state at each of check steps between the first check step and a second check step ahead of the first check step by a predetermined step number, wherein said second check step is selected such that the reference operating state at the second check step includes the change in the effective action of the machinery caused by the output element, and further after a third check step between the first and second check steps at which the reference operating state is coincident with the actual operating state corresponding to the first check step, to compare the actual operating states detected successively by said operation detecting means after the actual operating state corresponding to the first check step with the reference operating states at check steps ahead of the third check step respectively; and
   checking means for checking the operation of the machinery based on the difference detected by said difference detecting means.

2. A monitoring system according to claim 1 further comprising change detecting means for detecting a change in the actual operating states detected by said operation detecting means and means for producing an output indicating abnormality of the machinery when there is no reference operating state coincident with the actual operating state corresponding to the first check step at the check steps between the first and second check steps and in addition a new change in the actual operating states is not detected by said change detecting means within a predetermined period of time after the second check step.

3. A monitoring system according to claim 1 further comprising means for producing output indicating at least one of the elements of the sequential program control arrangement which caused the difference between the actual operating state corresponding to the first check step and the reference operating state at the second check step when there is no reference operating state coincident with the actual operating state corresponding to the first check step at the check steps between the first and second check steps.

4. A monitoring system according to claim 3 further comprising means for returning the check step for comparison to the first check step when there is no reference operating state coincident with the actual operating state corresponding to the first check step at the check steps between the first and second check steps.

5. A monitoring system according to claim 4 further comprising means for producing an output indicating at least one of the components of the sequential program control arrangement which caused the difference between the actual operating state corresponding to the first check step and the reference operating state at the first check step when the check step for comparison is returned to the first check step.

* * * * *